(12) United States Patent
Stone (10) Patent No.: US 12,410,781 B2
(45) Date of Patent: Sep. 9, 2025

(54) EXPANDABLE ELEMENT CONFIGURATION, METHOD AND SYSTEM

(71) Applicant: Baker Hughes Oilfield Operations LLC, Houston, TX (US)

(72) Inventor: Matthew Stone, Humble, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 157 days.

(21) Appl. No.: 17/384,088

(22) Filed: Jul. 23, 2021

(65) Prior Publication Data

US 2023/0027205 A1 Jan. 26, 2023

(51) Int. Cl.
| | |
|---|---|
| *F03G 7/06* | (2006.01) |
| *E21B 43/08* | (2006.01) |
| *E21B 43/10* | (2006.01) |
| *B33Y 70/00* | (2020.01) |
| *B33Y 80/00* | (2015.01) |

(52) U.S. Cl.
CPC ............ *F03G 7/0614* (2021.08); *E21B 43/08* (2013.01); *E21B 43/108* (2013.01); *F03G 7/0641* (2021.08); *B33Y 70/00* (2014.12); *B33Y 80/00* (2014.12)

(58) Field of Classification Search
CPC .... E21B 43/108; E21B 43/08; E21B 23/0415; F03G 7/0641; F03G 7/0614; B33Y 80/00; B33Y 70/00
See application file for complete search history.

(56) References Cited

U.S. PATENT DOCUMENTS

| | | | | |
|---|---|---|---|---|
| 4,846,279 | A | * | 7/1989 | Bruce ................... E21B 27/02 166/371 |
| 6,582,145 | B1 | * | 6/2003 | Malone ................ E21B 33/122 403/31 |
| 2005/0199401 | A1 | | 9/2005 | Patel et al. |
| 2008/0164035 | A1 | * | 7/2008 | Bolding ................. E21B 43/25 166/373 |
| 2013/0146311 | A1 | * | 6/2013 | Hathcoat ................ E21B 23/01 166/387 |
| 2014/0230537 | A1 | * | 8/2014 | Ringgenberg .......... E21B 47/12 73/152.02 |
| 2014/0332220 | A1 | | 11/2014 | Garza et al. |
| 2014/0360613 | A1 | | 12/2014 | Abshire et al. |
| 2015/0192001 | A1 | * | 7/2015 | Hall ....................... E21B 43/08 166/205 |
| 2016/0168950 | A1 | * | 6/2016 | Delgado ................ E21B 34/08 166/321 |
| 2016/0298631 | A1 | * | 10/2016 | Reid ....................... F04D 13/10 |
| 2017/0226836 | A1 | * | 8/2017 | Sanders ................. C09K 8/584 |

(Continued)

FOREIGN PATENT DOCUMENTS

WO 2016089526 A1 6/2016

OTHER PUBLICATIONS

International Search Report and Written Opinion; PCT/US2022/073844; Korean Intellectual Property Office; Mailed Nov. 4, 2022; 11 pages.

*Primary Examiner* — Yong-Suk (Philip) Ro
(74) *Attorney, Agent, or Firm* — Baker Hughes Patent Organization (57) ABSTRACT

A shape memory material element configuration. The element includes a shape memory material element, and a capillary line extending to the element, and positioned to apply an activation fluid to the element.

18 Claims, 6 Drawing Sheets

(56) References Cited

U.S. PATENT DOCUMENTS

2017/0362405 A1    12/2017  Murugesan et al.
2019/0360293 A1*  11/2019  Mack .................... E21B 17/206
2021/0054697 A1*   2/2021  Dokhon ................. E21B 34/06

* cited by examiner

EXPANDABLE ELEMENT CONFIGURATION, METHOD AND SYSTEM

BACKGROUND

In the resource recovery and fluid sequestration industries, deploying elements to filter fluids and support wellbore structure is common. Some of the elements deployed include shape memory attributes. These work well in general but sometimes there are complications in determining volume and application method for activation fluids that result in excess engineering and preparation time. These issues can also sometimes result in longer well downtime, which is always undesirable. Therefore the art will well receive alternatives that improve efficiency.

SUMMARY

An embodiment of a shape memory material element configuration including a shape memory material element, and a capillary line extending to the element and positioned to apply an activation fluid to the element.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
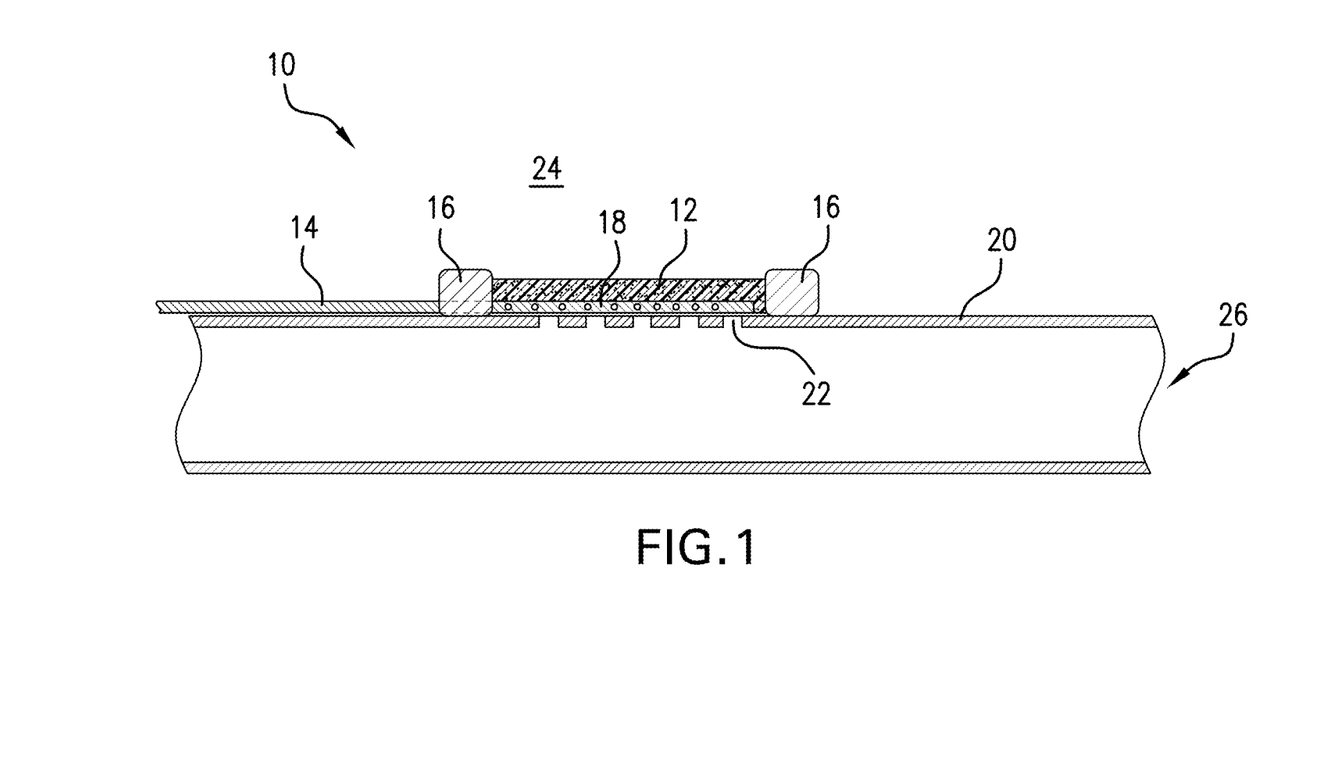
FIG. 1 is a side view of a shape memory material element configuration in accordance with the instant disclosure in a run in position.

Referring to FIG. 1, a shape memory material element configuration 10 is illustrated. The configuration 10 includes a shape memory material element 12 and a capillary supply line 14 that may end at the element 12 or continue into the element 12. The shape memory material is, in an embodiment, a shape memory polymer and is a porous medium that act well as a filter. One example of a material that could form a portion of the element 12 is GeoForm shape memory polymer material commercially available from Baker Hughes, Houston Texas. The configuration 10 may also include end rings 16 to axially secure the element 12 and a manifold 18 in fluid communication with the line 14 and disposed within the element 12. As illustrated, the configuration 10 may be disposed upon a tubular 20 (that may be a part of a string in a borehole). The tubular 20 optionally includes one or more ports 22 through a wall thereof that fluidly connect an inside diameter surface of the tubular 20 with an outside surface of the tubular 20. In the embodiment as illustrated, the configuration 10 is located to be radially disposed relative to the ports 22 such that fluid transfer between a formation 24 outside of the element 12 and a fluid volume 26 inside of the tubular 20 is filtered by the element 12.

Figure 2:
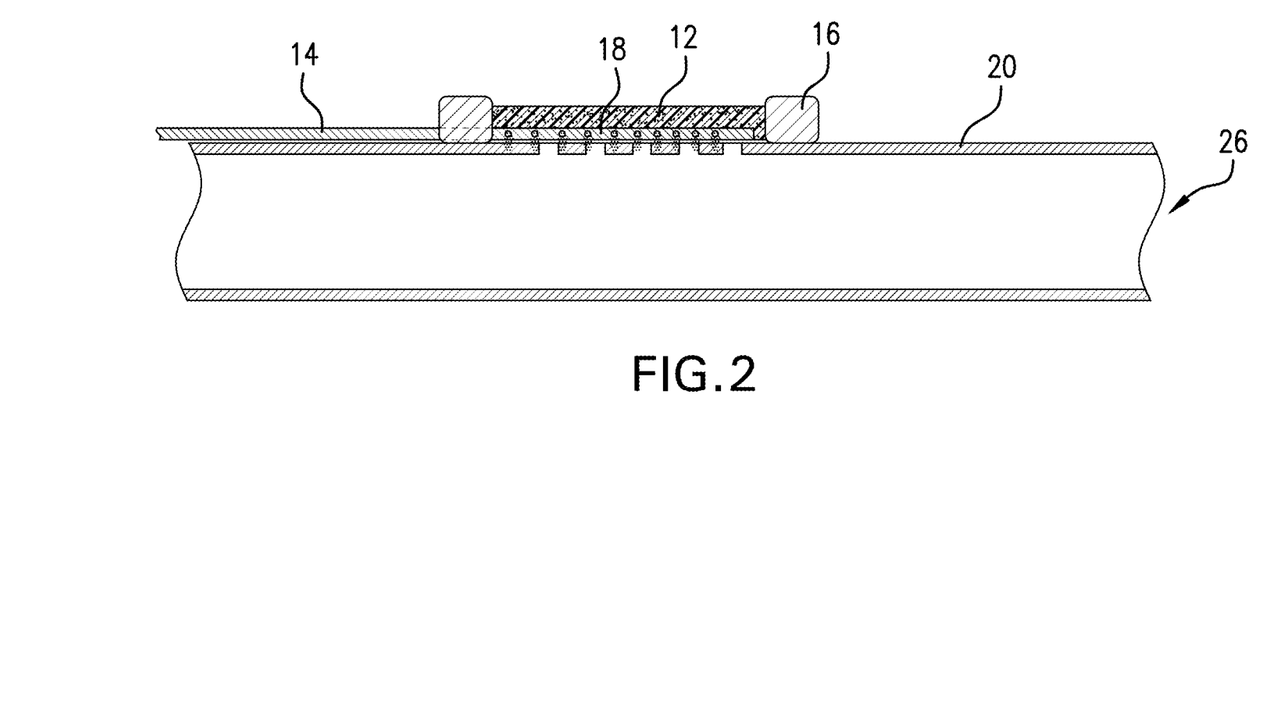
FIG. 2 is the view of FIG. 1 with an actuation fluid illustrated accessing the element.
Figure 3:
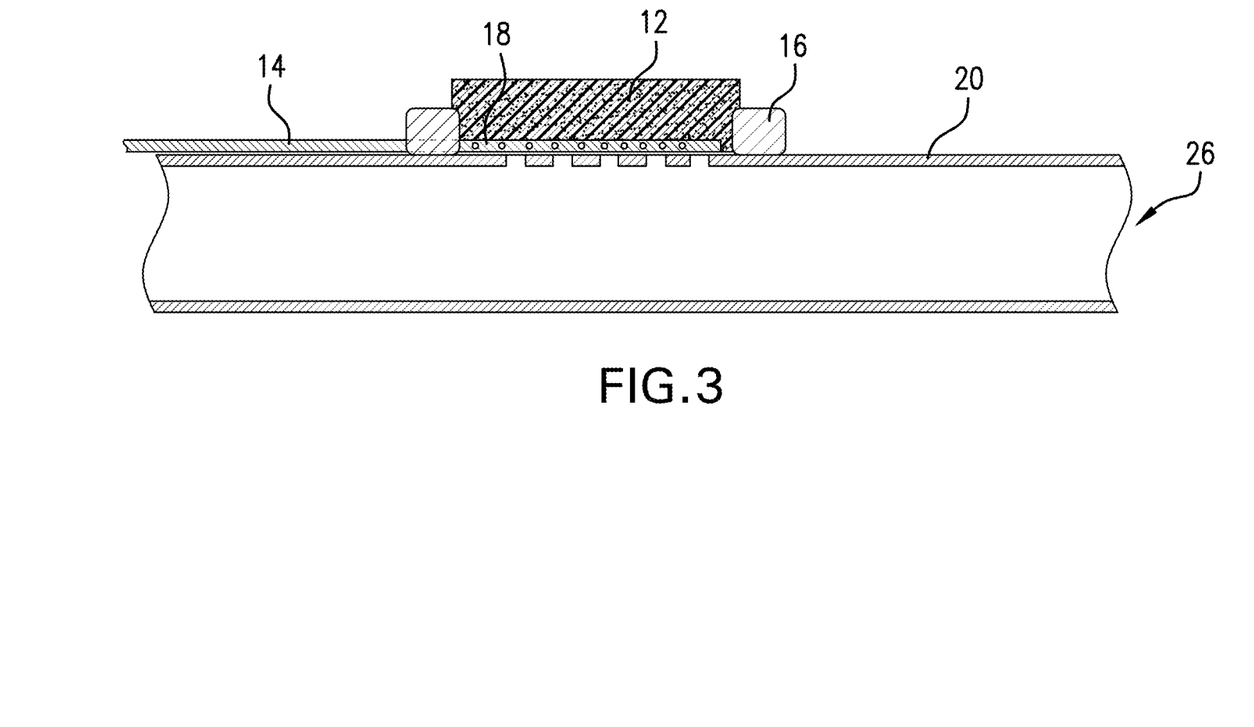
FIG. 3 is the view of FIG. 1 with the element in a deployed position.

Regarding the line 14, in one embodiment where the line simply connects to the element 12, activation fluid injected through the line will either perfuse directly through the porous structure of the element 12 or may be distributed through the manifold 18. Manifold 18 is either formed by the material of the element 12 or made from another material and disposed within the element 12. The manifold 18 may be linear or branching or may simply be a bulbous void in the element 12, in embodiments. If the manifold 18 is of another material, then it is fluidly connected to the line 14 by suitable means. Where the manifold is another material, that material may be porous in nature or may have one or more openings therein to allow activation fluid injected through line 14 to reach and perfuse the element 12. This is illustrated in FIG. 2. Once the element is perfused with the activation fluid, the element 12 expands as is illustrated in FIG. 3.

A significant benefit of the presently disclosed configuration is that excess activation fluid is not required, as it would be in most downhole uses of shape memory material. Because a capillary line 14 is employed, activation fluid may be measured for volume at surface and injected directly to the element. No dilution of the fluid would occur like it would in other uses of shape memory material downhole where a pill is pumped, for example. Prior art methods for delivering activation fluid to a tool that uses a shape memory material all result in dilution of the activation fluid which then requires more fluid than actually needed for material shape change and tends to create other undesirable consequences in the borehole.

Figure 4:
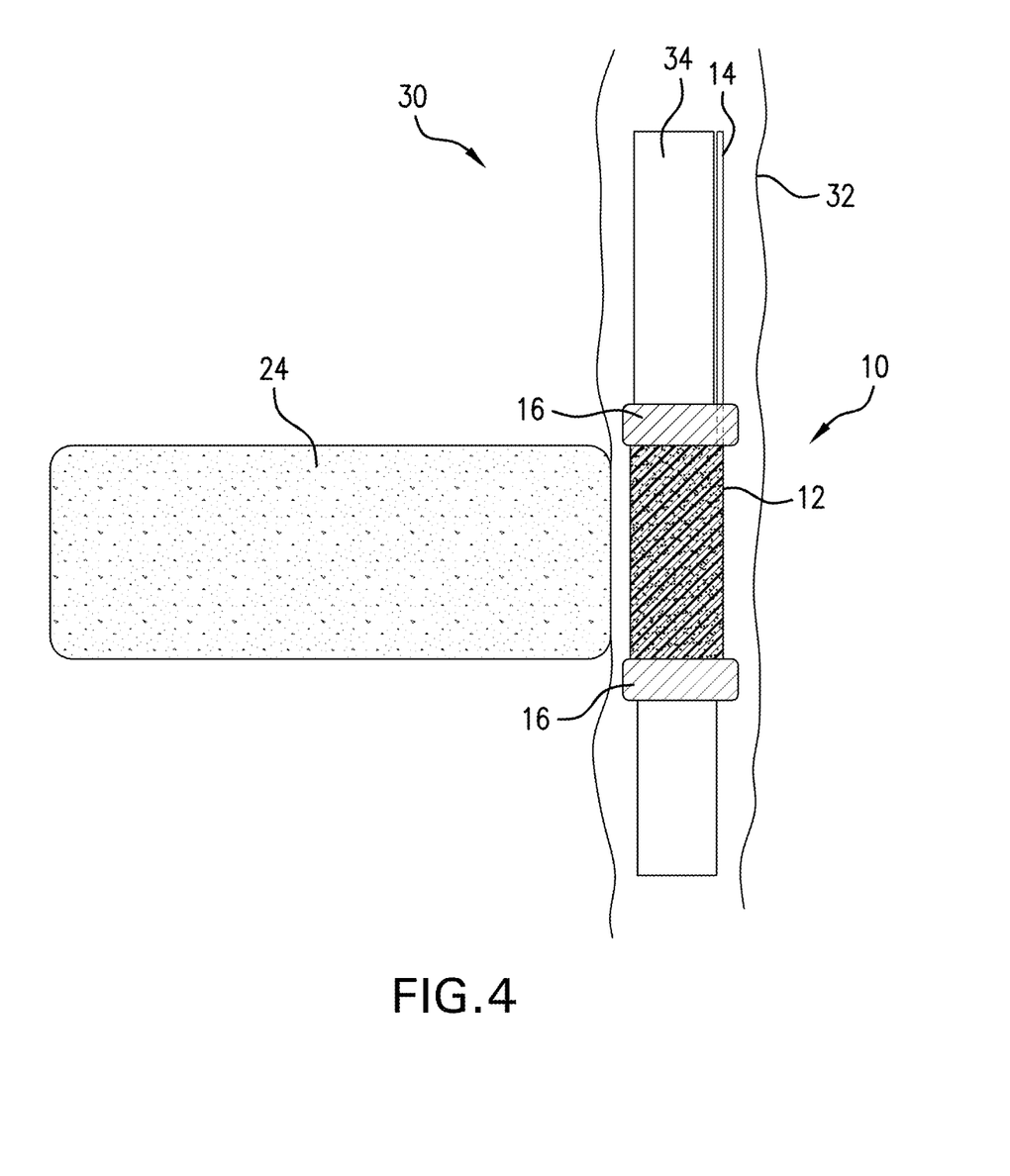
FIG. 4 is a schematic view of the shape memory material element configuration in a target location near a formation feature.
Figure 5:
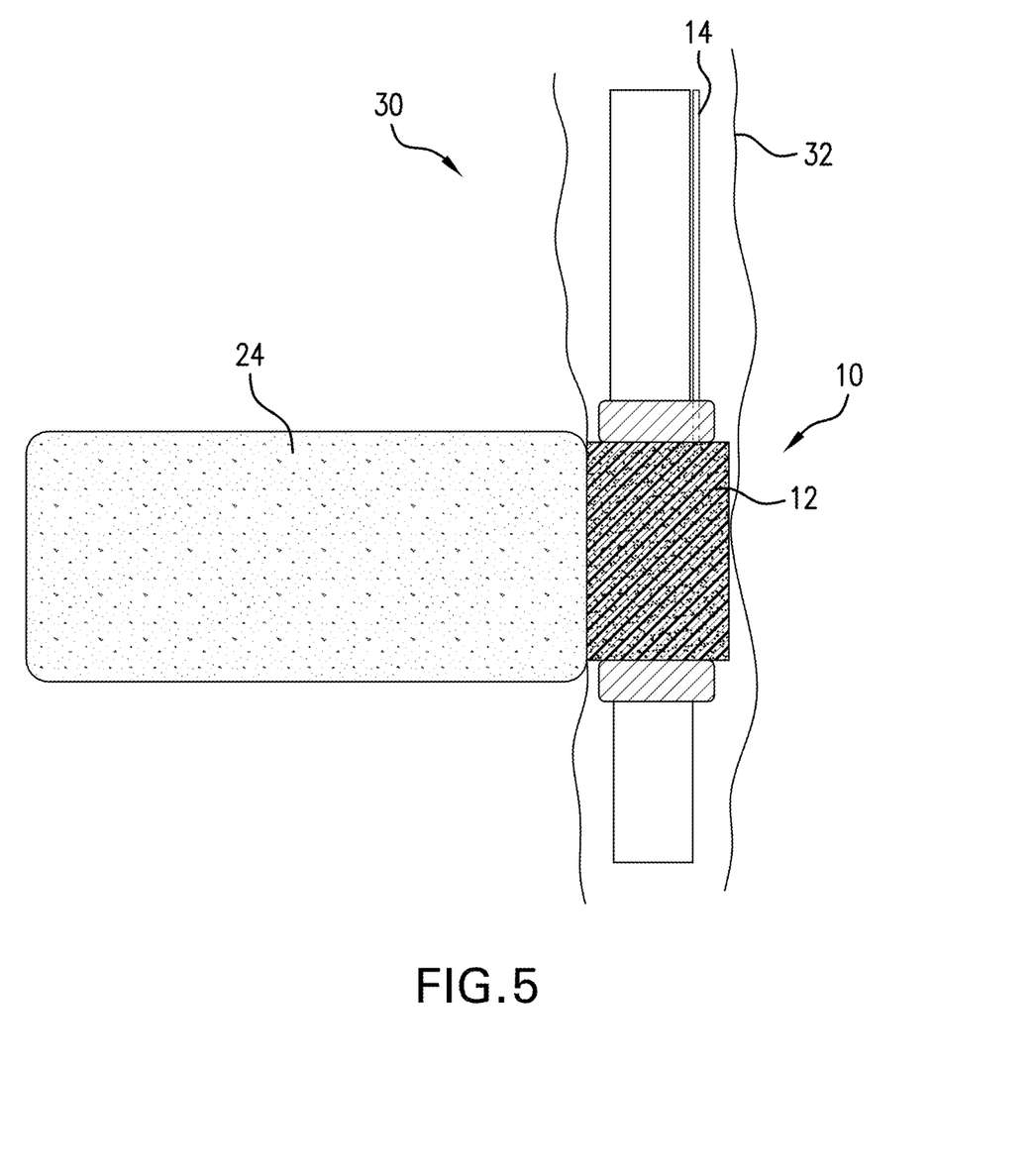
FIG. 5 is the view of FIG. 4 with the element expanded into proximity with the formation feature.
Figure 6:
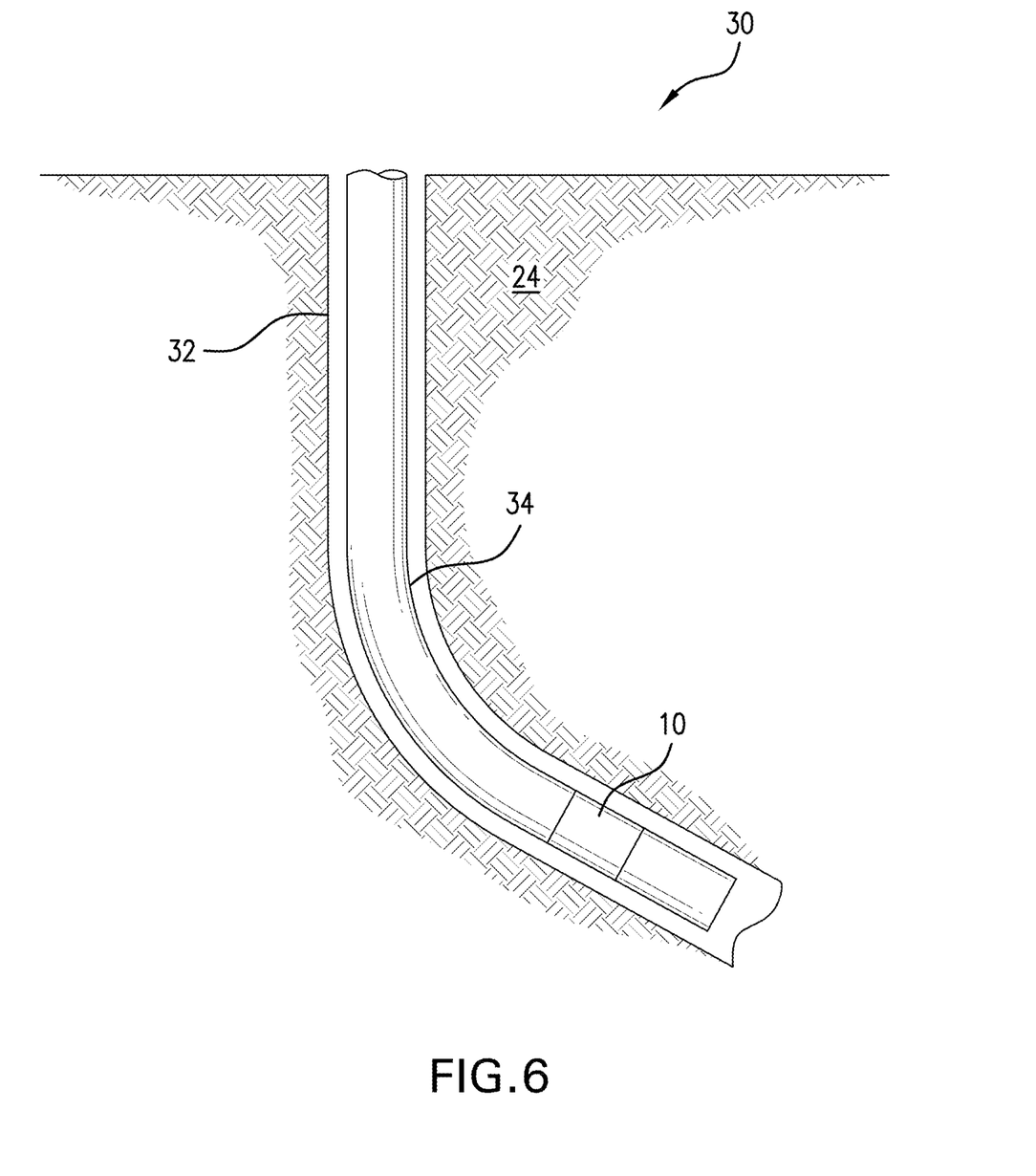
FIG. 6 is a view of a wellbore system including the shape memory material element configuration disclosed herein.

Referring to FIGS. 4, 5, and 6 a wellbore system 30 is illustrated. The system 30 includes a borehole 32 in the subsurface formation 24 (same as introduced above). A string 34 is disposed in the borehole 32. Disposed on the string is the configuration 10. It will be appreciated that the configuration 10 is disposed near the formation 24 with which fluid exchange is to occur. Upon the configuration reaching this illustrated location, the activation fluid is injected through line 14 to the element 12, whereby element 12 expands into close proximity or contact with the borehole 32. This condition is illustrated in FIG. 5. Once the FIG. 5 condition of the element 12 is achieved, fluid transfer from or too the formation 24 may commence while Filtration through the element 12 is achieved.

Set forth below are some embodiments of the foregoing disclosure:

Embodiment 1: A shape memory material element configuration including a shape memory material element, and a capillary line extending to the element and positioned to apply an activation fluid to the element.

Embodiment 2: The configuration as in any prior embodiment, wherein the shape memory material is a shape memory polymer.

Embodiment 3: The configuration as in any prior embodiment, wherein the element is permeable.

Embodiment 4: The configuration as in any prior embodiment, wherein the line extends into the element.

Embodiment 5: The configuration as in any prior embodiment, wherein a portion of the line extending into the element includes a plurality of orifices therein.

Embodiment 6: The configuration as in any prior embodiment, wherein a portion of the line extending into the element is porous to activation fluid.

Embodiment 7: The configuration as in any prior embodiment, further comprising a manifold in fluid connection with the line.

Embodiment 8: The configuration as in any prior embodiment, wherein the manifold is a separate structure from the element but disposed therein.

Embodiment 9: The configuration as in any prior embodiment, wherein the manifold is a created within the element.

Embodiment 10: The configuration as in any prior embodiment, wherein the manifold is an activation fluid distribution pathway within the element.

Embodiment 11: The configuration as in any prior embodiment, wherein the pathway is a branching pathway.

Embodiment 12: The configuration as in any prior embodiment, wherein the element expands upon exposure to the activation fluid.

Embodiment 13: A method for deploying a shape memory material element configuration as in any prior embodiment including injecting a volume of activating fluid through the capillary line, and infusing the shape memory material with the activating fluid.

Embodiment 14: The method as in any prior embodiment, further including regulating the volume of activating fluid such that the volume is sufficient to activate the element while avoiding excess activating fluid escape to an environment outside of the element.

Embodiment 15: The method as in any prior embodiment, further including contacting a borehole wall with the element and filtering fluid passing between a formation surrounding the borehole wall and an inside diameter surface of the element.

Embodiment 16: A method for deploying a shape memory material element configuration as in any prior embodiment including preparing a volume of activating fluid needed to deploy the element to be supplied to the element, and supplying the volume to the element without dilution or loss of the volume.

Embodiment 17: A wellbore system including a borehole in a subsurface formation, a string in the borehole, and a shape memory material element configuration as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semisolids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A shape memory material element configuration comprising:
    a shape memory material element having a remembered shape, the shape memory material including a manifold within the element configured to distribute activation fluid within the element; and
    a capillary line extending to the element and connected to the manifold to apply an activation fluid through the capillary line to the manifold, the activation fluid being distributed within the element and triggering the element to passively assume the remembered shape.

2. The configuration as claimed in claim 1 wherein the shape memory material is a shape memory polymer.

3. The configuration as claimed in claim 1 wherein the element is permeable.

4. The configuration as claimed in claim 1 wherein the line extends into the element.

5. The configuration as claimed in claim 4 wherein a portion of the line extending into the element includes a plurality of orifices in the line.

6. The configuration as claimed in claim 4 wherein a portion of the line extending into the element is porous to activation fluid.

7. The configuration as claimed in claim 1, further comprising a manifold in fluid connection with the line.

8. The configuration as claimed in claim 7 wherein the manifold is a separate structure from the element but disposed in the element.

9. The configuration as claimed in claim 7 wherein the manifold is a created within the element.

10. The configuration as claimed in claim 7 wherein the manifold is an activation fluid distribution pathway within the element.

11. The configuration as claimed in claim 10 wherein the pathway is a branching pathway.

12. The method as claimed in claim 10 further including regulating the volume of activating fluid such that the volume is sufficient to activate the element while avoiding excess activating fluid escape to an environment outside of the element.

13. The method as claimed in claim 10 further including contacting a borehole wall with the element and filtering fluid passing between a formation surrounding the borehole wall and an inside diameter surface of the element.

14. The configuration as claimed in claim 1 wherein the element expands upon exposure to the activation fluid.

15. A method for deploying a shape memory material element configuration as claimed in claim 1 comprising:
   injecting a volume of activating fluid through the capillary line; and
   infusing the shape memory material with the activating fluid.

16. A method for deploying a shape memory material element configuration as claimed in claim 1 comprising:
   preparing a volume of activating fluid needed to deploy the element to be supplied to the element; and
   supplying the volume to the element without dilution or loss of the volume.

17. A wellbore system comprising:
   a borehole in a subsurface formation;
   a string in the borehole; and
   a shape memory material element configuration as claimed in claim 1 disposed within or as a part of the string.

18. The configuration as claimed in claim 1 wherein the manifold is a separate structure from the element but disposed in the element.

* * * * *